Patented Mar. 9, 1926.

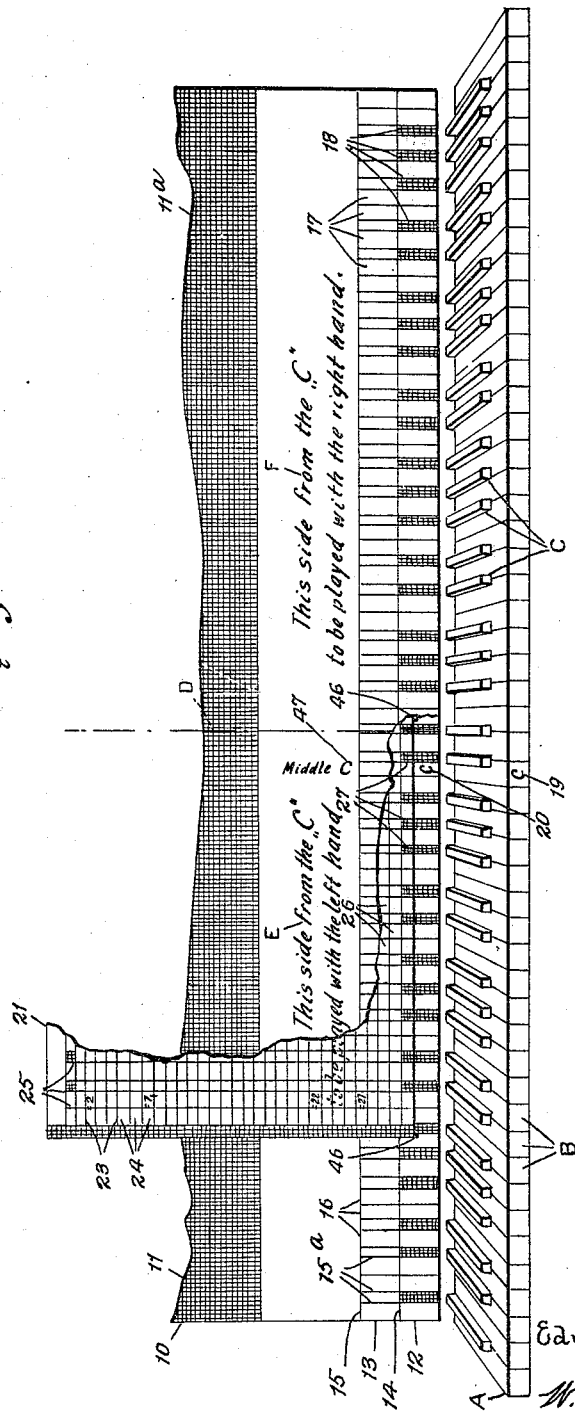

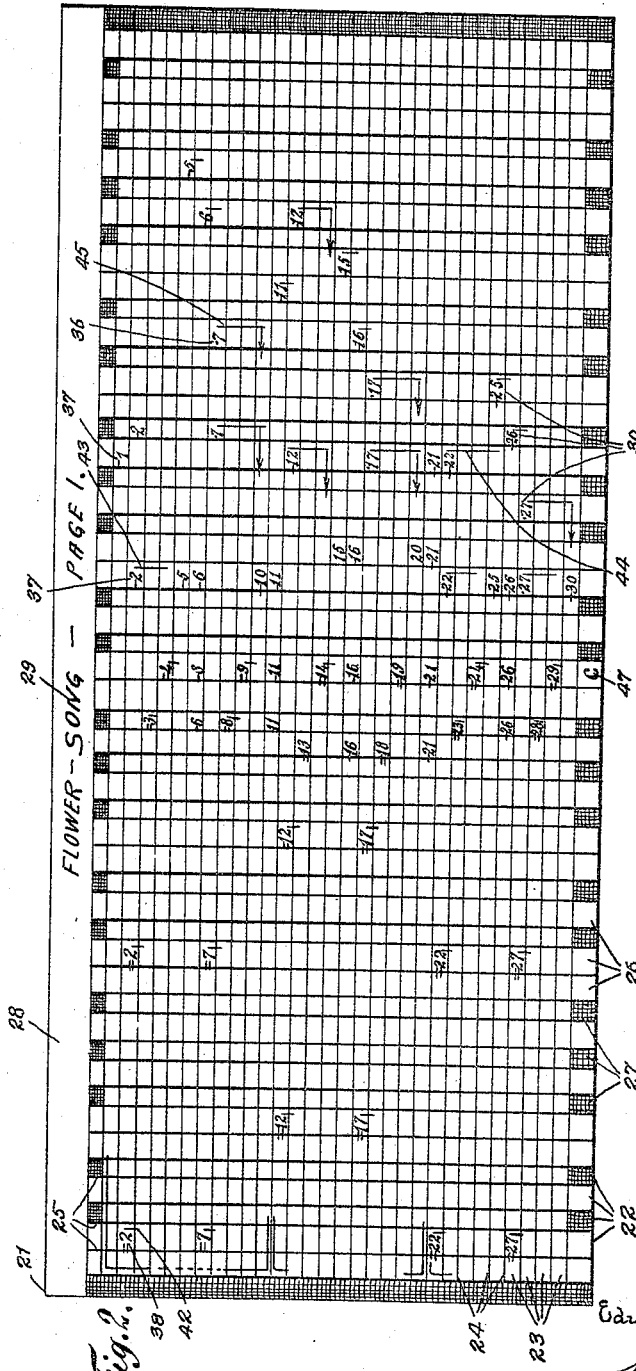

1,576,004

UNITED STATES PATENT OFFICE.

EDWARD ROSENBERG, OF BROOKLYN, NEW YORK.

INDICATOR FOR PIANO OR ORGAN KEYBOARDS.

Application filed February 2, 1925. Serial No. 6,301.

*To all whom it may concern:*

Be it known that I, EDWARD ROSENBERG, a citizen of the United States, and a resident of New York, borough of Brooklyn, in the county of Kings and State of New York, have invented certain new and useful Improvements in an Indicator for Piano or Organ Keyboards, of which the following is a full, clear, and exact specification.

This invention relates more particularly to a class of simplified music teaching systems.

My invention has for its object primarily to provide a system or method including elements designed to be employed for enabling persons to teach themselves to play the piano or organ without the services of instructors, and wherein is dispensed with the use of many of the signs and characters such as sharps, double sharps, flats, double flats, trills and other symbols which contribute to make the system of playing musical compositions by notes so difficult to learn and become a proficient player. While the system especially contemplates affording persons who may not be familiar with the notes of music, but who are musically inclined; that is, who can sing, hum or whistle a melody or song, an opportunity to correctly play the music thereof in harmony. The system may also be advantageously employed for practice purposes and in other ways by advanced players of pianos and organs.

The invention consists essentially of a guide surface element or board which may be a single unit or divided into two members or parts for being removably positioned above the finger board of a piano or organ. On the exposed face of this surface element are black and white sections of widths and in related positions corresponding with the playing keys of the finger board of the instrument. On one of the sections of the surface element is a pilot or guide symbol adapted to be registered with a central playing key of the instrument to indicate that the keys on one side thereof are to be played with the left hand and the keys on the other side thereof are to be played with the right hand. Included in the system is a separate sheet element for being removably positioned on the surface element, and on this sheet element are black and white sections of widths and in related positions corresponding to a determined number of the white and black sections of the surface element. On one of the sections of the sheet element is also a guide symbol for being registered with the guide symbol of the surface element to also register determined sections of the sheet element with determined sections of the surface element. Inscribed or otherwise provided on a number or all of the sections of the sheet element are symbols preferably in the forms of consecutive numerals representing the successive notes and values or counts thereof of a given composition of music corresponding to the respective keys of the piano or organ for playing the music. By playing the keys in successive order as indicated by the consecutive numerals and their counts the playing of the musical composition may be accomplished correctly and in harmony by persons who may not have a knowledge of the notes of music.

With these and other objects in view, the invention will be hereinafter more fully described with reference to the accompanying drawings forming a part of this specification in which similar characters of reference indicate corresponding parts in all the views, and will then be pointed out in the claims at the end of the description.

In the drawings, Figure 1 is a fragmentary view showing a front elevation of parts of the elements included in my improved system for playing pianos and organs as employed in conjunction with the finger board of the instrument.

Figure 2 is an enlarged front elevation of the sheet element used in the system.

Fig. 3 is a sectional view taken longitudinally through the sheet element shown in Fig. 2, and Fig. 4 illustrates a number of the characters used in the system for playing a musical composition.

In the system is provided a surface element or guide 10 which is preferably in the form of a substantially rectangular board of suitable width and of a length corresponding to the length of the finger board, as A, composed of the white keys B and the black keys C of a piano or organ, not shown. The surface element or board 10 may be of card board, binder's board, wood or other material, and the surface element may be in the form of a single unit or divided as indicated in dotted lines, at D, if desired into two or more members or parts, as 11, 11ª.

In practice the surface element 10 is positioned and supported on the piano or organ with one of its lengthwise edges in proximity to the keys of the finger board A of the instrument. The lower lengthwise edge portion of the surface element is divided into one or two rows of sections, as 12, 13, by inscribing or otherwise providing on one face of the surface element spaced parallel longitudinal lines 14, 15 which extend the entire length of the surface element and by inscribing or otherwise providing spaced parallel vertical lines 15ᵃ which extend from the lower edge of the surface element to the longitudinal line 15. Each section of the row 12 merges with each section of the row 13, and each pair of the sections may, therefore, be considered as one section 16. The sections 16 are of widths corresponding approximately to the widths of the white keys and black keys of the finger board of the instrument. The surface guide element 10 is arranged above the finger board A so that each of the sections 16 is in register with each of the keys of the finger board. The area of the number of the sections 16 corresponding to the white keys B of the finger board are preferably white, as 17, and the entire area or one-half of the area of the number of the sections 16 are preferably black, as 18. The white sections 16 are alined with the white keys of the finger board, and the black sections 18 are alined with the black keys of the finger board of the piano or organ for permitting a person to quickly observe and understand which of the class of keys of the finger board should be played. On one of the central white keys B of the finger board A is inscribed a guide symbol 19 which may be in the form of the letter C, and on one of the central white sections 17 of the surface element 10 may be inscribed a guide symbol 20 also in the form of a letter C which is in register with the letter C of the surface element to indicate to the player of the instrument that the keys of the finger board to the left of these registered guide symbols are to be played with the left hand and that the keys of the finger board to the right of these registered guide symbols are to be played with the right hand, as explained by the wordings E and F, respectively, inscribed on the surface element at the sides of the guide symbol 20 of the surface element.

Included in the system is a sheet element 21 of preferably a substantially rectangular shape, and this sheet element may be of paper or other suitable material appropriate for inscription thereon of characters representing the notes of a musical composition. The sheet element 21 may also be of a similar or smaller size than the surface guide element 10, and one face of the sheet element is divided into vertical sections 22 and into longitudinal sections 23. The sections 23 are provided by inscribing on the sheet element spaced parallel longitudinal lines 24 across the sheet element, and as many of the longitudinal sections 23 as desired may be provided. The sections 22 are provided by inscribing on the sheet element space parallel vertical lines 25 on the sheet element. The vertical sections 22 correspond in number and in widths to the white and black sections 17, 18 of the surface element. A number of the sections 22 are preferably white, as 26, to correspond with the white sections 17 of the surface element 10 and with the white keys B of the finger board of the instrument, and the lower end portions of the other sections 22 are preferably black, as 27, to correspond with the black sections 18 of the surface element 10 and with the black keys C of the finger board of the instrument. The upper end portions of the sections 22 of the sheet element 21 may also be black, as shown, to enable the player to quickly discern the black sections 27 and to also enable the player to readily distinguish the white sections 26 from the black sections 27. On the upper lengthwise edge of the sheet element 21 above its white and black sections may be a blank marginal portion, as 28, on which may be inscribed the title or subject matter, as 29, of a musical composition.

The notes, the values and counts thereof and the order in which the notes of a musical composition should be played are transposed in this system into symbols of any distinctive character, such as numerals, as 30. I prefer to employ the numerals in either single consecutive order or in series with the numerals of each series in consecutive relation for indicating to a player who may not be familiar with the notes of music that by playing the keys of the piano or organ according to the successive symbols or numerals and their values the notes of the music will be correctly played on the instrument. Fig. 4 illustrates a table or index of the symbols used in this system for representing the values or counts of the notes of music, and in this index I use the single numeral "5" for indicating the notes, instead of using the different numerals in succession as employed in the system in practice and as shown on the sheet element 21.

The count or value of a note of music corresponds to one second of a period of time, and is played on a piano or organ by keeping its respective key in a downward position for such a period. The symbol 31 represents a whole note of four counts; the symbol 32 represents a note of six count value; the symbol 33 represents a note of seven counts; the symbol 34 represents a half note of two counts; the symbol 35 represents a note of three counts; the symbol 36 represents a quarter note of one count; the symbol 37 represents an eighth note; the symbol 38 represents a sixteenth note; the symbol 39 represents a thirty-second note; the symbol 40 represents a sixty-fourth note; the symbol 41 represents a grace note for being played in a time corresponding to the count of a sixty-fourth note; the symbol 42 represents a legato note for connecting the note to another note in a limited number of counts; the symbol 43 represents another legato note for connecting the note to other notes which are played in quick succession; the symbol 44 represents still another legato note for indicating that several notes are to be played in succession; and the symbol 45 represents a tie for indicating that when one or more notes of a chord is played the value or more notes thereof is retained until the note or notes of the following chord is played.

The sheet element may be removably supported on the surface guide element 10 by means of spaced pins, as 46, or otherwise, and at the lower end of one of the central white sections 26 of the sheet element is a guide symbol 47 in the form of the letter C. The sheet element is positioned on the surface element so that this symbol 47 is in register with the symbols 20 and 19 of the surface element and of the finger board A of the instrument for indicating that the note symbols on the sheet element at the left of the guide symbol 47 are to be played with the left hand and that the note symbols on the sheet element at the right of the guide symbol 47 are to be played with the right hand.

While the black and white vertical sections 26, 27 of the sheet element 21 correspond to the keys of the finger board of the piano and organ, the longitudinal sections of the sheet element represent chords. The sheet element 21 shown in the drawings illustrates part of a well known song transposed into this system for simplifying the playing thereof, and a number of the symbols shown in the index in Fig. 4 are changed to consecutive single numerals and to consecutive series of numerals having their respective count or value symbols associated therewith. The single numerals or symbols are each played as a chord, and each series of the numbers or symbols are also played as a chord. As shown, the separate chords are provided in the successive longitudinal sections 23 beginning with the upper longitudinal chord section of the sheet element. The first note of the musical composition or song illustrated is transposed into the numeral one as the symbol 37. The notes of the next chord of the song, which is played after playing the symbol 37, are played in the time indicated by the symbols 37 and 38, and two of these notes are played with each hand of the player. Two of these notes are legato notes 42 and the keys of the instrument is held in downward position until the note numeral three of the chord below is played. One of the other numeral notes two is also a legato note 43 and this key of the instrument is pressed in downward position until the numerals three and four in the next following chord sections 23 are played. The remainder of the notes of the song are played according to the consecutive single symbols or the consecutive series of symbols inscribed in the chord sections 23 and in the black and white sections 26 which follow those above explained. Where the tie symbol 45 is indicated on the sheet element the note or notes associated therewith are connectedly played with the notes in the other chord sections to which the symbol 45 represented by an arrow points. Various musical compositions may be transposed in this improved system for allowing persons to readily play them on the piano or organ without requiring a knowledge and the skill required for playing music by notes.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. In a system for playing pianos and organs, a guide surface element for being removably positioned above the finger board of the musical instrument, said surface element having white and black sections of widths and in related positions corresponding to the playing keys of the finger board of the instrument, a guide symbol on the surface element for being registered with a given central playing key of the instrument to indicate that the playing keys on one side thereof are to be played with the left hand and the playing keys on the other side thereof are to be played with the right hand, a separate sheet element for being removably positioned on the surface element and having white and black sections of widths and in related positions corresponding to a determined number of white and black sections of the surface element, a guide symbol on one of the sections of the sheet element for being registered with the guide symbol of the surface element to also register determined sections of the sheet element with determined sections of the surface element, and consecutive indicating symbols on the sections of the sheet element representing the consecutive notes of a given composition of music corresponding to the respective keys of the instrument for playing the music.

2. In a system for playing pianos and organs, a guide surface element for being removably positioned above the finger board of the musical instrument, said surface element having white and black sections of widths and in related positions corresponding to the playing keys of the finger board of the instrument, a guide symbol on the surface element for being registered with a given central playing key of the instrument to indicate that the playing keys on one side thereof are to be played with the left hand and the playing keys on the other side thereof are to be played with the right hand, a separate sheet element for being removably positioned on the surface element and having white and black sections of widths and in related positions corresponding to a determined number of white and black sections of the surface element, a guide symbol on one of the sections of the sheet element for being registered with the guide symbol of the surface element to also register determined sections of the sheet element with determined sections of the surface element, consecutive indicating symbols on the sections of the sheet element representing the consecutive notes of a given composition of music corresponding to the respective keys of the instrument for playing the music, and said note symbols including associate symbols for indicating the counts of the note symbols.

3. In a system for playing pianos and organs, a guide surface element for being removably positioned above the finger board of the musical instrument, said surface element having white and black sections of widths and in related positions corresponding to the playing keys of the finger board of the instrument, a guide symbol on the surface element for being registered with a given central playing key of the instrument to indicate that the playing keys on one side thereof are to be played with the left hand and the playing keys on the other side thereof are to be played with the right hand, a separate sheet element for being removably positioned on the surface element and having white and black sections of widths and in related positions corresponding to a determined number of white and black sections of the surface element, a guide symbol on one of the sections of the sheet element for being registered with the guide symbol of the surface element to also register determined sections of the sheet element with determined sections of the surface element, consecutive indicating symbols on the sections of the sheet element representing the consecutive notes of a given composition of music corresponding to the respective keys of the instrument for playing the music, said note symbols including associate symbols for indicating the counts of the note symbols, and a number of the note symbols also including symbols for including legato playing of symbols with other determined symbols.

4. In a system for playing pianos and organs, a guide surface element for being removably positioned above the finger board of the musical instrument, said surface element having white and black sections of widths and in related positions corresponding to the playing keys of the finger board of the instrument, a guide symbol on the surface element for being registered with a given central playing key of the instrument to indicate that the playing keys on one side thereof are to be played with the left hand and the playing keys on the other side thereof are to be played with the right hand, a separate sheet element for being removably positioned on the surface element and having white and black sections of widths and in related positions corresponding to a determined number of white and black sections of the surface element, a guide symbol on one of the sections of the sheet element for being registered with the guide symbol of the surface element to also register determined sections of the sheet element with determined sections of the surface element, and consecutive indicating symbols on the sections of the sheet element representing the consecutive notes of a given composition of music corresponding to the respective keys of the instrument for playing the music, said note symbols including associate symbols for indicating the counts of the note symbols, a number of the note symbols also including symbols for indicating legato playing of the symbols with other determined symbols and the note symbols also including tie symbols for indicating that the symbols of different chords of the music are to be connectedly played.

5. In a system for playing pianos and organs, a substantially rectangular guide board for being removably positioned above the finger board of the musical instrument, said guide board having white and black sections of widths and in related positions corresponding to the playing keys of the finger board of the instrument, a separate approximately rectangular sheet element for being removably positioned on the guide board and having white and black sections of widths and in related positions corresponding to a determined number of white and black sections of the guide board, consecutive indicating symbols on the sections of the sheet element representing the consecutive notes of a given composition of music corresponding to the respective keys of the instrument for playing the music, and said note symbols including associate symbols for indicating the counts of the note symbols.

6. In a system for playing pianos and organs, a substantially rectangular guide board for being removably positioned above the finger board of the musical instrument, said guide board having white and black sections of widths and in related positions corresponding to the playing keys of the finger board of the instrument, a separate approximately rectangular sheet element for being removably positioned on the guide board and having white and black sections of widths and in related positions corresponding to a determined number of white and black sections of the guide board, consecutive indicating symbols on the sections of the sheet element representing the consecutive notes of a given composition of music corresponding to the respective keys of the instrument for playing the music, said note symbols including associate symbols for indicating the counts of the note symbols, a number of the note symbols also including symbols for indicating legato playing of the symbols with other determined symbols, and a number of the note symbols including tie symbols for indicating that the symbols of different chords are to be connectedly played.

This specification signed this 31 day of January A. D. 1925.

EDWARD ROSENBERG.